United States Patent
Loganathan et al.

(10) Patent No.: US 8,898,525 B2
(45) Date of Patent: Nov. 25, 2014

(54) METHOD AND SYSTEM FOR USE IN CONDITION MONITORING

(75) Inventors: Karthikeyan Loganathan, Kondapur (IN); Narasimham Lanka, Musheerabad (IN)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 13/449,014

(22) Filed: Apr. 17, 2012

(65) Prior Publication Data
US 2013/0275813 A1 Oct. 17, 2013

(51) Int. Cl.
*G06F 11/00* (2006.01)

(52) U.S. Cl.
USPC ............................................ 714/47.1; 714/26

(58) Field of Classification Search
CPC ............ G06F 11/3409; G06F 11/3466; G06F 11/2257; G06F 11/079
USPC ............................ 714/47.1, 26; 702/182–186
See application file for complete search history.

(56) References Cited

U.S. PATENT DOCUMENTS

| | | | |
|---|---|---|---|
| 5,041,976 A | 8/1991 | Marko et al. | |
| 5,099,436 A | 3/1992 | McCown et al. | |
| 5,557,549 A | 9/1996 | Chang | |
| 6,473,659 B1 * | 10/2002 | Shah et al. | 700/79 |
| 6,671,830 B2 * | 12/2003 | Kaler et al. | 714/39 |
| 7,509,234 B2 * | 3/2009 | Unnikrishnan et al. | 702/183 |
| 7,623,932 B2 | 11/2009 | Miller et al. | |
| 7,793,151 B2 * | 9/2010 | Miller et al. | 714/26 |
| 8,078,913 B2 * | 12/2011 | Goldszmidt et al. | 714/26 |
| 8,356,207 B2 * | 1/2013 | Hosek et al. | 714/26 |
| 8,648,700 B2 * | 2/2014 | Gilbert | 340/425.5 |
| 2013/0246860 A1 * | 9/2013 | Callan | 714/47.1 |

* cited by examiner

*Primary Examiner* — Philip Guyton
(74) *Attorney, Agent, or Firm* — Armstrong Teasdale LLP

(57) ABSTRACT

A condition monitoring system including at least one computing device also includes a memory device configured to store data associated with a monitored device and at least one input channel that is configured to receive the data associated with the monitored device. The condition monitoring system further includes a processor coupled to the memory device and the at least one input channel. The processor is programmed to determine a potential fault condition by comparing at least a portion of the data associated with the monitored device with at least one scenario programmed therein. The at least one scenario is at least partially based on at least one predetermined event associated with at least one condition of the monitored device.

20 Claims, 4 Drawing Sheets

METHOD AND SYSTEM FOR USE IN CONDITION MONITORING

BACKGROUND OF THE INVENTION

The present application relates generally to condition monitoring of systems and equipment, and more particularly, to a method and system for use in condition monitoring of electrical switchgear.

In most known industrial power distribution systems, electric power generated by a power generation company may be supplied to an industrial and/or commercial facility for distribution within the industrial/commercial facility. At least some of these known power distribution systems use electrical switchgear to divide the power into circuit branches which supply power to various portions of the facility. Generally, circuit breakers are provided in each circuit branch to facilitate protecting equipment within the circuit branch. Additionally, circuit breakers in each circuit branch may facilitate minimizing equipment failures since specific loads may be energized or deenergized without affecting other loads.

In many of such known facilities, the switchgear includes a number of mechanical components and monitoring devices, e.g., input/output (I/O) devices coupled to control devices and data collection devices. However, a large volume of information is exchanged and recorded between the devices, and post-malfunction troubleshooting efforts requiring examination of such data may be extensive in time consumption and cost. Also, during extensive data reviews, a technician may not capture the root causes of the malfunction, thereby extending the troubleshooting efforts. Moreover, subtle conditions, e.g., minor, but chronic, under-frequency and over-voltage conditions in the facility may remain undiagnosed for extended periods of time.

BRIEF DESCRIPTION OF THE INVENTION

In one embodiment, a condition monitoring system including at least one computing device also includes a memory device configured to store data associated with a monitored device and at least one input channel. The at least one input channel is configured to receive the data associated with the monitored device. The condition monitoring system further includes a processor coupled to the memory device and the at least one input channel. The processor is programmed to determine a potential fault condition by comparing at least a portion of the data associated with the monitored device with at least one scenario programmed therein. The at least one scenario is at least partially based on at least one predetermined event associated with at least one condition of the monitored device.

In another embodiment, a method of determining a condition of a monitored device is provided. The method includes providing a computer-based condition monitoring system. The method also includes comparing at least a portion of monitored data associated with the monitored device with at least one scenario programmed in the condition monitoring system. The at least one scenario is at least partially based on at least one predetermined event associated with at least one condition of the monitored device. The method further includes determining a potential fault condition by at least partially matching one event in the at least one scenario and at least a portion of data associated with the monitored device.

In yet another embodiment, one or more non-transitory computer-readable storage media having computer-executable instructions embodied thereon are provided. Such instructions, when executed by at least one processor, cause the at least one processor to compare at least a portion of monitored data associated with a monitored device with at least one scenario programmed in the condition monitoring system. The at least one scenario is at least partially based on at least one predetermined event associated with at least one condition of the monitored device. Also, such instructions, when executed by the at least one processor, cause the at least one processor to determine a potential fault condition by at least partially matching one event in the at least one scenario and at least a portion of data associated with the monitored device.

DETAILED DESCRIPTION OF THE INVENTION

Figure 1:
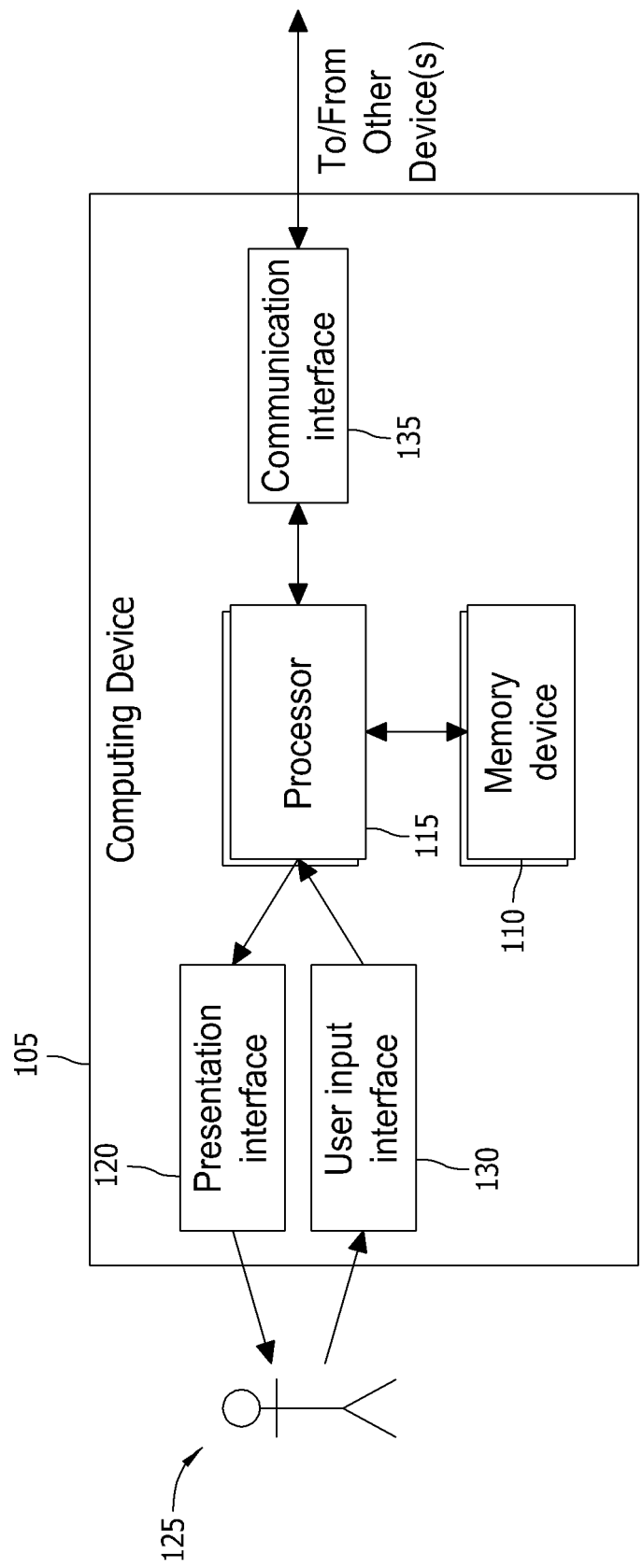
FIG. 1 is a block diagram of an exemplary computing device.

FIG. 1 is a block diagram of an exemplary computing device 105 that may be used to perform condition monitoring of any equipment and/or, including, without limitation, electrical switchgear (not shown in FIG. 1). Computing device 105 includes a memory device 110 and a processor 115 operatively coupled to memory device 110 for executing instructions. Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Further, as used herein, the terms "software" and "firmware" are interchangeable, and include any computer program stored in memory for execution by personal computers, workstations, clients and servers.

Moreover, as used herein, the term "non-transitory computer-readable media" includes all tangible, computer-readable media, such as a firmware, floppy disk, CD-ROMs, DVDs and another digital source such as a network or the Internet, as well as yet to be developed digital means, with the sole exception being a transitory, propagating signal.

Memory device 110 may be configured to store operational measurements including, without limitation, electrical bus (not shown) voltage and current readings, substation (not shown) voltage and current readings, localized frequency, voltage, and current readings throughout the electrical switchgear, discrete events that include, without limitation, circuit breaker operations, alarms/warnings, and/or any other type of data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate condition monitoring of the electrical switchgear (discussed further below).

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 includes an audio output device (not shown) (e.g., an audio adapter and/or a speaker) and/or a printer (not shown). In some embodiments, presentation interface 120 presents an alarm associated with the electrical switchgear being monitored, such as by using a human machine interface (HMI) (not shown in FIG. 1).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
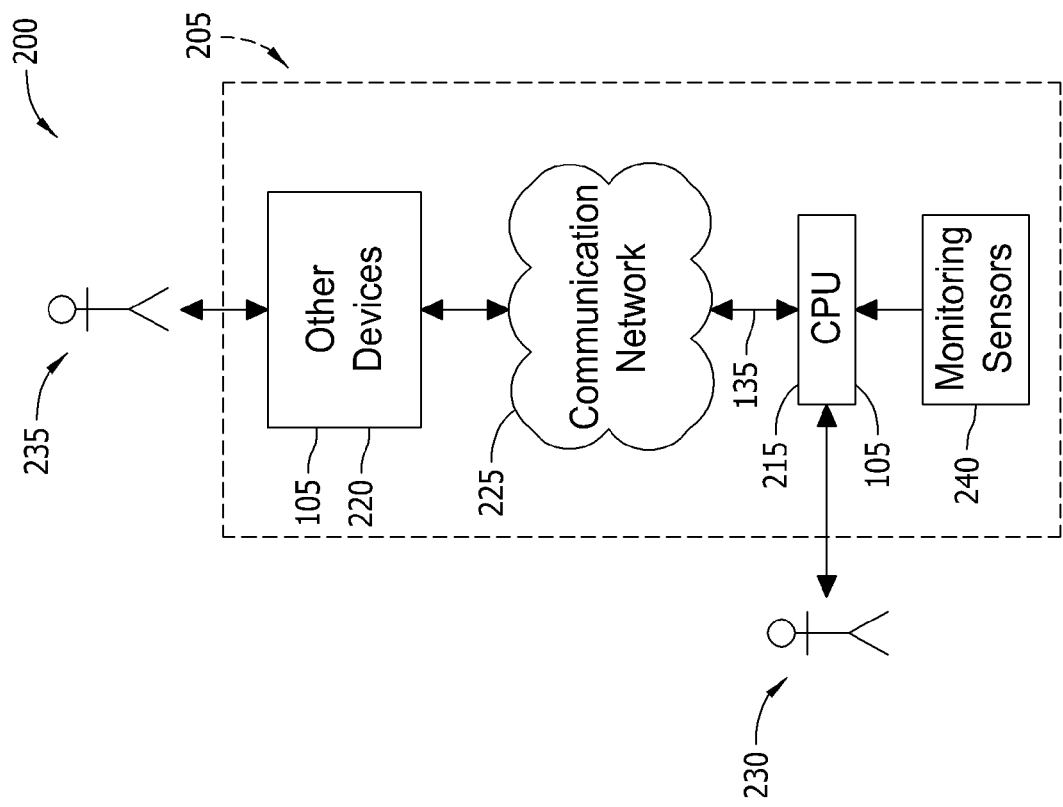
FIG. 2 is block diagram of a portion of an exemplary switchgear monitoring and control system.

FIG. 2 is block diagram of a portion of an exemplary switchgear monitoring and control system 200 that may be used to monitor and control at least a portion of electrical switchgear 205. Switchgear monitoring and control system 200 includes at least one central processing unit (CPU) 215 that may be coupled to other devices 220 via a communication network 225. CPU 215 may be, without limitation, a facility-level centralized controller, a switchgear-level centralized controller, one of a plurality of distributed controllers, and a portable controller. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, CPU 215 may perform all of the operations below.

Referring to FIGS. 1 and 2, CPU 215 is a computing device 105. In the exemplary embodiment, computing device 105 is coupled to network 225 via communication interface 135. In an alternative embodiment, controller 215 is integrated with other devices 220. As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 2), and these terms are used interchangeably herein.

CPU 215 interacts with a first operator 230 (e.g., via user input interface 130 and/or presentation interface 120). In one embodiment, CPU 215 presents information about switchgear 205, such as alarms, to operator 230. Other devices 220 interact with a second operator 235 (e.g., via user input interface 130 and/or presentation interface 120). For example, other devices 220 present alarms and/or other operational information to second operator 235. As used herein, the term "operator" includes any person in any capacity associated with operating and maintaining switchgear 205, including, without limitation, shift operations personnel, maintenance technicians, and facility supervisors.

In the exemplary embodiment, switchgear 205 includes one or more monitoring sensors 240. Monitoring sensors 240 collect operational measurements including, without limitation, frequency, voltage, and current readings throughout switchgear 205, including, without limitation, circuit breaker and relay readings, and/or any other type of data. Monitoring sensors 240 repeatedly (e.g., periodically, continuously, and/or upon request) transmit operational measurement readings at the time of measurement. CPU 215 receives and processes the operational measurement readings. Also, CPU 215 includes, without limitation, sufficient data, algorithms, and commands to facilitate condition monitoring of switchgear 205 (discussed further below).

Also, in alternative embodiments, additional monitoring sensors (not shown) similar to monitoring sensors 240 may collect operational data measurements associated with the remainder of an electric power system (not shown), of which switchgear 205 is merely a portion of, including, without limitation, data from additional switchgear and environmental data, including, without limitation, local temperatures. Such data is transmitted across network 225 and may be accessed by any device capable of accessing network 225 including, without limitation, desktop computers, laptop computers, and personal digital assistants (PDAs) (neither shown).

In the exemplary embodiment, monitoring sensors 240 may generate a large volume of data. Therefore, other devices 220 includes at least one data server with a database and storage system that enables operation of switchgear 205 and switchgear monitoring and control system 200 as described herein.

Figure 3:
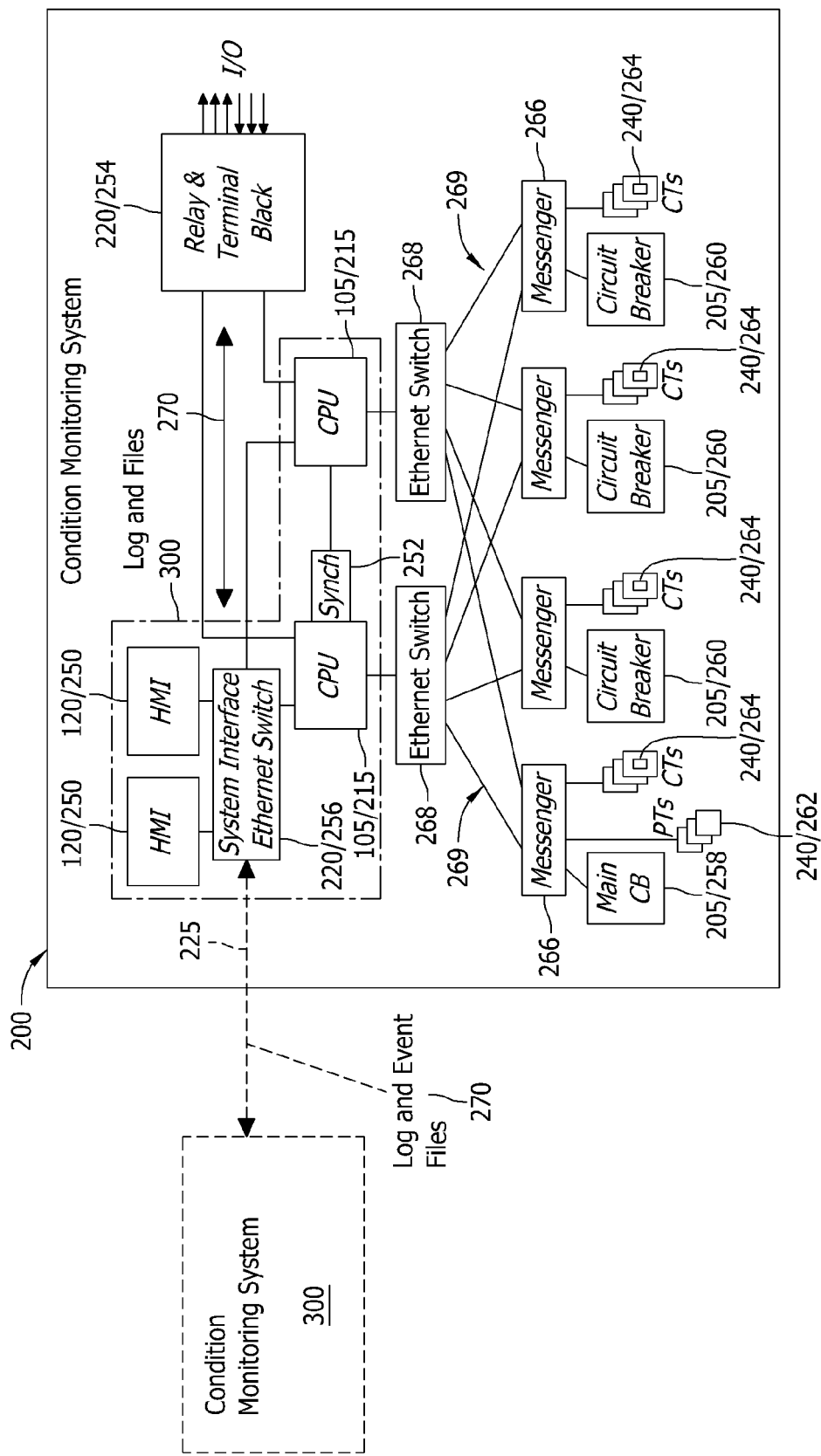
FIG. 3 is a block diagram of the exemplary switchgear monitoring and control system partially shown in FIG. 2 and coupled to exemplary electrical switchgear.

FIG. 3 is a block diagram of switchgear monitoring and control system 200 integrated with electrical switchgear 205. System 200 includes two presentation interfaces 120, i.e., two HMIs 250. System 200 also includes two redundant CPUs 215 that are coupled through a synchronization device 252. A relay and terminal block 254 transmits input and output (I/O) signals redundantly to and from CPUs 215 and to and from other devices 220, including, without limitation, a data server (not shown), though communication interface 135 (shown in FIG. 1). Similarly, system 200 includes a system interface Ethernet switch 256 redundantly coupled HMIs 250 to CPUs 215. Also, Ethernet switch 256 couples system 200 to external systems, including, without limitation, a supervisory control and data acquisition system (not shown), the Internet (not shown) through communication network 225, and a data server (not shown).

In the exemplary embodiment, switchgear 205 includes a main circuit breaker 258 that is coupled to an external power source (not shown), for example, without limitation, a substation. Switchgear 205 also includes a plurality of distribution circuit breakers 260 that are coupled to a bus (not shown) within switchgear 205. A plurality of potential (voltage) transformers (PTs) 262 are associated with main circuit breaker 258, i.e., one PT 262 per phase. Similarly, each of main circuit breaker 258 and distribution circuit breakers 260 are associated with a plurality of current transformers (CTs) 264, i.e., one CT 264 per phase.

Also, in the exemplary embodiment, switchgear monitoring and control system 200 includes a messenger 266 coupled to each of PTs 262 and CTs 264. Each messenger 266 functions as an analog-to-digital (A/D) converter of voltage and current signals at breakers 258 and 260. Each messenger 266 also functions in any manner that facilitates operation of switchgear monitoring and control system 200 and switchgear 205 as described herein, including, without limitation, transmitting operational instructions from CPUs 215 to circuit breakers 258 and 260.

Further, in the exemplary embodiment, switchgear monitoring and control system 200 includes a plurality of Ethernet switches 268, i.e., two switches 268 redundantly coupled to each messenger 266 and each CPU 215. Each PT 262 and CT 264, messenger 266, and Ethernet switch 268 define an input channel 269 into each CPU 215.

Moreover, in the exemplary embodiment, switchgear monitoring and control system 200 generates and stores a plurality of log and event files 270 within CPUs 215. Each log and event file 270 includes stored data associated with operation of switchgear 205 and system 200, including, without limitation, voltage and current readings, circuit breaker switching events, alarm initiation and clearance, and protective events. In at least one embodiment, log and event files 270 are stored on a data server (not shown) coupled to switchgear monitoring and control system 200 as described above. Therefore, each log entry or event defines a data record that includes a plurality of event record fields, including, without restriction, a plain language description of the event, a date and time stamp, and an alphanumeric cause designation that is associated with at least one failure, or fault, mechanism.

Also, in the exemplary embodiment, switchgear monitoring and control system 200 includes a computer-based condition monitoring system 300. System 300 is implemented in CPUs 215, wherein an operator of switchgear 205 may run a condition monitoring diagnostic whenever desired. Alternatively, system 300 (shown in phantom) is implemented within a portable computer-based device, e.g., one of other devices 105/220 (shown in FIG. 2), coupled to switchgear 205 and system 200 during planned maintenance events through communication network 225 (shown in FIGS. 2 and 3). Also, alternatively, system 300 (shown in phantom) is implemented within a stand-alone computer, e.g., one of other devices 105/220, coupled to switchgear monitoring and control system 200 through communication network 225. Condition monitoring system 300 is described further below.

Figure 4:
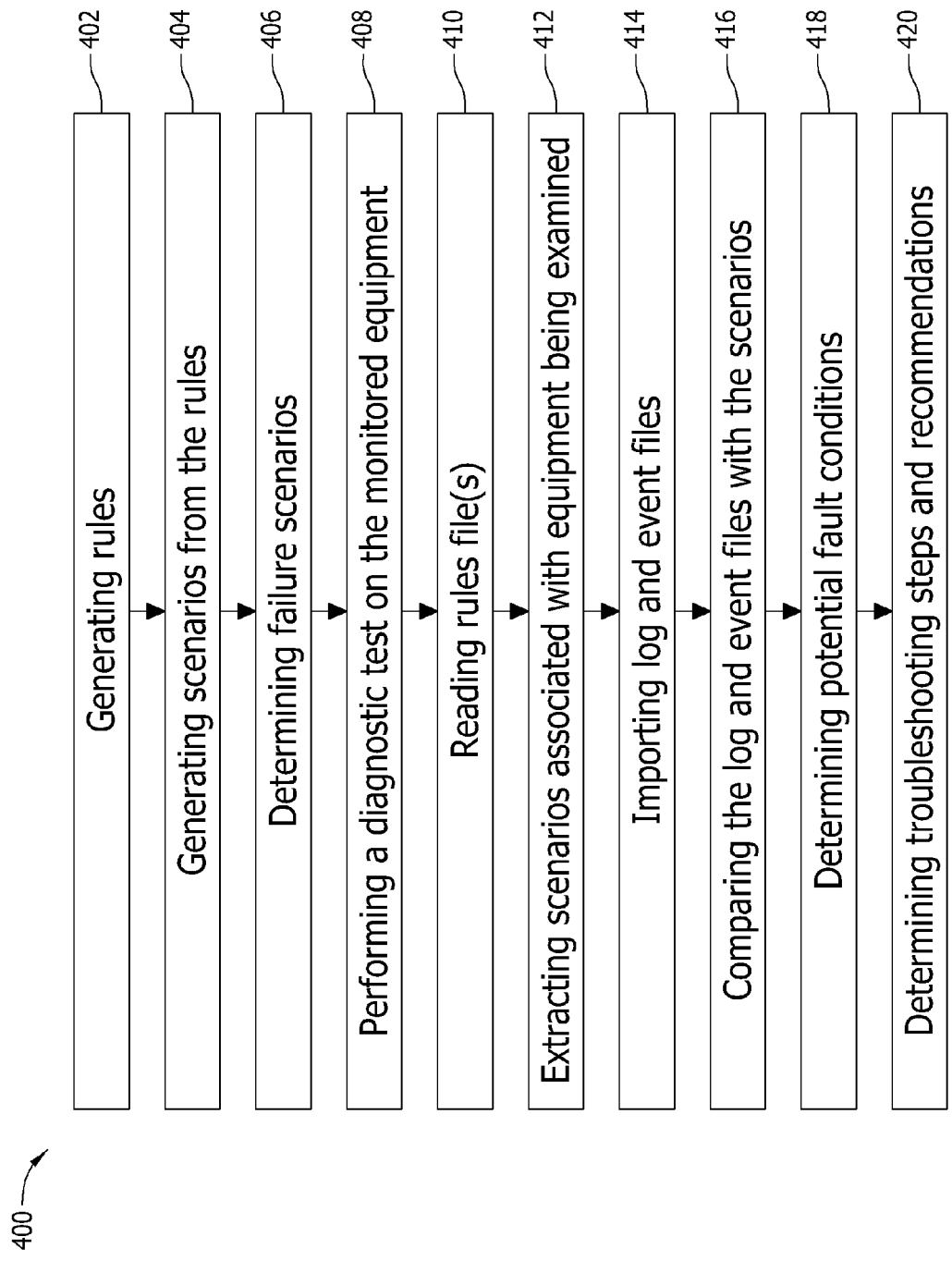
FIG. 4 is a flow chart of an exemplary method of performing condition monitoring using the system shown in FIG. 3.

FIG. 4 is a flow chart of an exemplary method 400 of performing condition monitoring using condition monitoring system 300 (shown in FIG. 3). System 300 is a computer-implemented, rules-based, condition monitoring system that is implemented and configured to perform diagnostic testing of switchgear 205 (shown in FIG. 3) to determine the condition of switchgear 205. System 300 is implemented within switchgear monitoring and control system 200 and includes at least one computing device 105 (shown in FIGS. 1, 2, and 3), e.g., CPU 215 (shown in FIGS. 2 and 3), and at least one input channel 269 (shown in FIG. 3). Alternatively, system 300 implemented in a device coupled to system 200, e.g., one of a portable computer-based device and a stand-alone computer.

In the exemplary embodiment, a plurality of rules (not shown) are generated 402. The rules include, without limitation, design parameters and sequenced operating procedures of the monitored device, e.g., switchgear 205 (shown in FIG. 3). The rules are generated at least partially based on at least one of expert knowledge of the monitored device, fleet operational history of the monitored device, predetermined events associated with at least one condition of the monitored device, software requirements and specifications (SRSs) of the programmed features of the monitored equipment, and executing regression testing using such knowledge of the equipment to generate and verify the rules. The regression test cases are created to facilitate coverage of approximately 100% of the monitored equipment, i.e., switchgear 205.

The rules are used to define events that have a potential of occurring during operation of switchgear 205 as a function of the proven historic operating behavior of switchgear 205. Such events may induce fault conditions, including, without limitation, chronic under-voltage conditions and instantaneous short circuit conditions.

Events are divided into two classifications, i.e., single events and multiple events. For example, without limitation, a failure of a circuit breaker to close may be caused by a single event such as a control power fuse blowing merely due to that particular fuse reaching the nominal end of useful life. In contrast, failure of a circuit breaker to close could be caused by a plurality of events such as the closing mechanism inducing an increasing resistance to closing due to decreasing clearances/tolerances in the components of the closing mechanism, resulting in a series of increasing time periods between the closing command and actual closing of the breaker. Other events include those events associated with monitored equipment, including, without limitation, relay protection devices, long time and short time protection devices, ground fault devices, under-voltage devices, and under-frequency devices. Moreover, events may also include performance of preventive maintenance and corrective maintenance activities.

Condition monitoring system 300 is implemented with any number of events that enables operation of system 300 as described herein. Moreover, system 300 is scalable with utility features that such that it facilitates expanding the rule base, and facilitating review and approval of the new rules through the use of regression testing.

In the exemplary embodiment, alarm and/or warning indications are also considered events. In general, data such as routine voltage, current, and frequency readings, are not used by condition monitoring system 300. However, a trending feature may be used to determine an estimated time period to reaching an alarm/warning setpoint or other critical condition of switchgear 205.

Also, in the exemplary embodiment, a plurality of scenarios (not shown) are generated 404. Such scenarios are defined as one or more predefined and related events in a predetermined expected sequence that define a predetermined situation/condition. The scenarios are generated from the rules and the associated events. Therefore, condition monitoring system 300 enables identifying selected conditions of switchgear 205 into a recognizable pattern. One such recognizable pattern is a series of events that include increasing time periods between a circuit breaker closing command and actual closing of the circuit breaker. The associated scenario will include these events as an early indication of a faulty condition in the closing mechanism of the circuit breaker, and the scenario will end with the circuit breaker failing to close upon receipt of the closing command. Also, if synchronization is required to close the breaker, out-of-synchronization warnings and alarms transmitted to user 125 (shown in FIG. 1) and/or first operator 230 and/or second operator 235 (both shown in FIG. 2) are events that will also be in the associated scenario. Regression tests are also used to generate and/or validate the scenarios, wherein such regression tests are based on at least one of expert knowledge of the monitored device and fleet operational history of the monitored device. Condition monitoring system 300 is implemented with any number of scenarios that enables operation of system 300 as described herein.

Further, in the exemplary embodiment, a plurality of failure scenarios are generated 406 from the scenarios generated as described above. Such failure scenarios are a subset of the scenarios. Alternatively, only failure scenarios are generated within condition monitoring system 300 and subjected to regression testing based on at least one of expert knowledge of the monitored device and fleet operational history of the monitored device. Condition monitoring system 300 is implemented with any number of failure scenarios that enables operation of system 300 as described herein.

In the exemplary embodiment, a diagnostic test of switchgear 205 is performed 408 using condition monitoring system 300. In the exemplary embodiment, an algorithm implemented within CPUs 215 (shown in FIG. 3) is employed to perform the diagnostic testing, wherein an operator of switchgear 205 may run a condition monitoring diagnostic whenever desired. Alternatively, the algorithm is implemented within a portable computer-based device, e.g., other devices 105/220 (shown in FIG. 2), that is coupled to switchgear 205 and system 200 during planned maintenance events through communication network 225 (shown in FIGS. 2 and 3). Also, alternatively, the algorithm is implemented within a stand-alone computer, e.g., other devices 105/220, that is coupled to switchgear monitoring and control system 200 through communication network 225. The algorithm is configured to distinguish normal conditions and behavior of the monitored devices, e.g., switchgear 205, against faulty conditions and behavior using events which define the operating condition of the equipment.

Also, in the exemplary embodiment, at least one rules file is read 410 upon launching of the algorithm in condition monitoring system 300. The scenarios associated with switchgear 205 are extracted 412 and temporarily stored in memory device 110 (shown in FIG. 1). Log and event files 270 (shown in FIG. 3) stored within switchgear monitoring and control system 200 are imported 414 and temporarily stored in memory device 110. As described above, each log and event file 270 includes stored data associated with operation of switchgear 205 and system 200, including, without limitation, voltage and current readings, circuit breaker switching events, alarm and/or warning initiation, protective events, and performance of preventive and corrective maintenance activities.

Log and event files 270 are compared 416 with the scenarios stored in memory device 110 and a determination is made 418 with respect to the existence of potential fault conditions. Specifically, the event record cause designation field in each log and event 270 record is checked as to whether it is the starting event of any one of the failure scenarios. As described above, the scenarios are at least partially based on one predetermined initiating event, or a plurality of related events that include at least one initiating event, associated with at least one condition of the monitored device.

If a match is made, the same event record is further examined for the description of the event and the associated component, e.g., without limitation, one of circuit breakers 258 and 260 (both shown in FIG. 3). If there is not match, the next record is inspected.

In some cases, for those scenarios based on a plurality of related events, only some of the events may be accounted for in the associated log and event file 270 data records. Therefore, a partial match is made and the algorithm implemented in condition monitoring system 300 facilitates distinguishing between expected events that are a portion of the scenario that have not occurred and expected events that are a portion of the scenario that have occurred. Moreover, the algorithm implemented in condition monitoring system 300 facilitates determining the temporal status of switchgear 205, including, without limitation, trending analysis and determining an approximate time to component failure as a function of the date and time stamps of the data records and known temporal measurements and determinations between events within a scenario.

The algorithm implemented in condition monitoring system 300 facilitates determining 420 at least one of troubleshooting steps and recommendations based on a diagnosed fault condition.

While the exemplary embodiment describes a diagnostic tool for electric switchgear apparatus and systems, the condition monitoring system described herein may be used for any system that records a large volume of operating data. Examples of additional systems that may use the condition monitoring system described herein include, without limitation, large power generation facilities, extended electric power transmission and distribution systems, and chemical and food processing facilities.

In contrast to known condition monitoring systems, the computer-based condition monitoring systems as described herein translate all the event information obtained from the system being monitored into knowledge-based objects, or expressions, called scenarios. Such scenarios are derived from known events and sequences thereof, thereby defining a pattern that can be recognized during an automated review. Regression testing is used to facilitate generating and verifying the scenarios. As a result, in contrast to known condition monitoring systems, the computer-based condition monitoring systems as described herein execute the automated review in an efficient manner, regardless of the large volume of system data exchanged between the controllers, or CPUs, and other I/O devices or mechanical components. Therefore, the computer-based condition monitoring systems as described herein quickly and effectively extract useful information about the health of the system being monitored and applying such information to fault diagnostics thereof. Moreover, in contrast to known condition monitoring systems, the computer-based condition monitoring systems as described herein is a knowledge-based system that is not difficult to implement and operate. Moreover, unusual conditions or potential fault conditions may be recognized prior to their manifesting themselves as actual faults. Therefore, unnecessary maintenance outages may be avoided with an easy-to-use, readily available diagnostic system, thereby facilitating a cumulative cost savings for operations and maintenance managers.

An exemplary technical effect of the methods, systems, and apparatus described herein includes at least one of (a) creating rules-based/pattern-based system, equipment, and component scenarios from knowledge-based events and event sequences; (b) performing regression testing on knowledge-based rules and events to generate scenarios and performing regression testing on the scenarios to validate them; (c) comparing event log data to the scenarios to determine if at least one fault-inducing condition is present; and (d) providing the users with standardized troubleshooting steps and original equipment manufacturer (OEM) recommendations based on a diagnosed fault condition.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A condition monitoring system for monitoring at least one circuit breaker, said condition monitoring system comprising at least one computing device comprising:
    a memory device configured to store data associated with the at least one circuit breaker, wherein the data includes frequency, voltage, and current readings of the at least one circuit breaker;
    at least one input channel, said at least one input channel configured to receive the data associated with the at least one circuit breaker; and
    a processor coupled to said memory device and said at least one input channel, said processor programmed to predict a potential fault condition that has not yet occurred by comparing at least a portion of the data associated with the at least one circuit breaker with at least one scenario programmed therein, wherein said at least one scenario is at least partially based on at least one predetermined event associated with at least one condition of the at least one circuit breaker.

2. A condition monitoring system in accordance with claim 1, wherein said processor is further programmed to determine said at least one scenario as a function of regression tests executed based on at least one of expert knowledge of the at least one circuit breaker and fleet operational history of the at least one circuit breaker.

3. A condition monitoring system in accordance with claim 1, wherein said processor is further programmed to predict the potential fault condition by determining an occurrence of at least one initiating event within a predetermined sequence of events.

4. A condition monitoring system in accordance with claim 3, wherein said processor is further programmed to determine expected events that are a portion of the at least one scenario that have not occurred.

5. A condition monitoring system in accordance with claim 1, wherein said processor is further programmed to determine said at least one scenario based on one of a single event and a plurality of predetermined events.

6. A condition monitoring system in accordance with claim 1, wherein said processor is further programmed to determine at least one of troubleshooting steps and recommendations based on a diagnosed fault condition.

7. A method of determining a condition of at least one circuit breaker, said method comprising:
    providing a computer-based condition monitoring system;
    receiving monitored data from the at least one circuit breaker, wherein the monitored data includes frequency, voltage, and current readings of the at least one circuit breaker;
    comparing at least a portion of monitored data associated with at least one scenario programmed in the condition monitoring system, wherein the at least one scenario is at least partially based on at least one predetermined event associated with at least one condition of the at least one circuit breaker; and
    predicting a potential fault condition that has not yet occurred by at least partially matching one event in the at least one scenario and at least a portion of monitored data associated with the at least one circuit breaker.

8. A method in accordance with claim 7, further comprising determining the at least one scenario comprising:
    programming predetermined equipment data into the condition monitoring system, wherein the equipment data comprises at least one of expert knowledge of the at least one circuit breaker and fleet operational history of the at least one circuit breaker; and
    determining a plurality of rules by performing regression testing using the equipment data.

9. A method in accordance with claim 8, further comprising determining at least one scenario based on one of a single event and a plurality of predetermined events based on at least a portion of the plurality of rules.

10. A method in accordance with claim 9, wherein determining at least one scenario comprises determining at least one failure scenario.

11. A method in accordance with claim 7, wherein predicting a potential fault condition comprises an occurrence of at least one initiating event within a predetermined sequence of events.

12. A method in accordance with claim 7, wherein comparing at least a portion of monitored data comprises distinguishing between expected events that are a portion of the at least one scenario that have not occurred and expected events that are a portion of the at least one scenario that have occurred.

13. A method in accordance with claim 7, wherein predicting a potential fault condition comprises determining at least one of troubleshooting steps and recommendations based on a diagnosed fault condition.

14. One or more non-transitory computer-readable storage media having computer-executable instructions embodied thereon, wherein when executed by at least one processor, the computer-executable instructions cause the at least one processor to:
  providing a computer-based condition monitoring system;
  receive monitored data from at least one circuit breaker, wherein the monitored data includes frequency, voltage, and current readings of the at least one circuit breaker;
  compare at least a portion of monitored data associated with the at least one circuit breaker with at least one scenario programmed in a condition monitoring system, wherein the at least one scenario is at least partially based on at least one predetermined event associated with at least one condition of the at least one circuit breaker; and
  predict a potential fault condition that has not yet occurred by at least partially matching one event in the at least one scenario and at least a portion of monitored data associated with the at least one circuit breaker.

15. One or more non-transitory computer-readable storage media in accordance with claim 14, wherein when executed by at least one processor, the computer-executable instructions further cause the at least one processor to determine the at least one scenario including determining a plurality of rules by performing regression testing using predetermined equipment data programmed into the at least one processor, wherein the equipment data includes at least one of expert knowledge of the at least one circuit breaker and fleet operational history of the at least one circuit breaker.

16. One or more non-transitory computer-readable storage media in accordance with claim 15, wherein when executed by at least one processor, the computer-executable instructions further cause the at least one processor to determine at least one scenario based on one of a single event and a plurality of predetermined events based on at least a portion of the plurality of rules.

17. One or more non-transitory computer-readable storage media in accordance with claim 16, wherein when executed by at least one processor, the computer-executable instructions further cause the at least one processor to determine at least one scenario by determining at least one failure scenario.

18. One or more non-transitory computer-readable storage media in accordance with claim 14, wherein when executed by at least one processor, the computer-executable instructions further cause the at least one processor to predict a potential fault condition based on an occurrence of at least one initiating event within a predetermined sequence of events.

19. One or more non-transitory computer-readable storage media in accordance with claim 14, wherein when executed by at least one processor, the computer-executable instructions further cause the at least one processor to distinguish between expected events that are a portion of the at least one scenario that have not occurred and expected events that are a portion of the at least one scenario that have occurred.

20. One or more non-transitory computer-readable storage media in accordance with claim 14, wherein when executed by at least one processor, the computer-executable instructions further cause the at least one processor to determine at least one of troubleshooting steps and recommendations based on a diagnosed fault condition.

* * * * *

UNITED STATES PATENT AND TRADEMARK OFFICE
CERTIFICATE OF CORRECTION

PATENT NO. : 8,898,525 B2  
APPLICATION NO. : 13/449014  
DATED : November 25, 2014  
INVENTOR(S) : Loganathan et al.

Page 1 of 1

It is certified that error appears in the above-identified patent and that said Letters Patent is hereby corrected as shown below:

In the claims

In Column 10, Line 35, in Claim 7, delete "breaker:" and insert -- breaker; --, therefor.

Signed and Sealed this
Twelfth Day of January, 2016

Michelle K. Lee
*Director of the United States Patent and Trademark Office*